(12) United States Patent
Berkey et al.

(10) Patent No.: US 6,970,632 B2
(45) Date of Patent: Nov. 29, 2005

(54) SOLID TYPE SINGLE POLARIZATION FIBER AND APPARATUS

(75) Inventors: George E. Berkey, Pine City, NY (US); Xin Chen, Corning, NY (US)

(73) Assignee: Corning Incorporated, Corning, NY (US)

( * ) Notice: Subject to any disclaimer, the term of this patent is extended or adjusted under 35 U.S.C. 154(b) by 39 days.

(21) Appl. No.: 10/837,861

(22) Filed: May 3, 2004

(65) Prior Publication Data

US 2005/0244118 A1    Nov. 3, 2005

(51) Int. Cl.$^7$ .............................................. G02B 6/22
(52) U.S. Cl. ...................... 385/126; 385/127; 385/100; 385/11
(58) Field of Search ................... 385/123–128, 385/11, 100; 65/403

(56) References Cited

U.S. PATENT DOCUMENTS

| | | | |
|---|---|---|---|
| 3,808,549 A | 4/1974 | Maurer | 331/94.5 |
| 4,134,642 A | 1/1979 | Kapron et al. | 350/96.33 |
| 4,179,189 A | 12/1979 | Kaminow et al. | 350/96.33 |
| 4,184,859 A | 1/1980 | Maklad | 65/2 |
| 4,274,854 A | 6/1981 | Pleibel et al. | 65/2 |
| 4,307,938 A | 12/1981 | Dyott | 350/96.3 |
| 4,354,736 A | 10/1982 | Maklad et al. | 350/96.32 |
| 4,372,646 A | 2/1983 | Strahan et al. | 350/96.31 |
| 4,426,129 A | 1/1984 | Matsumura et al. | 350/96.33 |
| 4,493,530 A | 1/1985 | Kajioka et al. | 350/96.34 |
| 4,500,168 A | 2/1985 | Kajioka et al. | 350/96.34 |
| 4,529,426 A | 7/1985 | Pleibel et al. | 65/3.11 |
| 4,610,506 A | 9/1986 | Tokunaga et al. | 350/96.33 |
| 4,630,889 A | 12/1986 | Hicks, Jr. | 350/96.3 |
| 4,669,814 A | 6/1987 | Dyott | 350/96.15 |
| 4,818,047 A | 4/1989 | Takuma et al. | 350/96.33 |
| 4,859,223 A | 8/1989 | Kajioka et al. | 65/3.12 |
| 4,896,942 A | 1/1990 | Onstott et al. | 350/96.33 |
| 5,056,888 A | 10/1991 | Messerly et al. | 385/123 |
| 5,149,349 A | 9/1992 | Berkey et al. | 65/3.11 |
| 5,180,410 A | 1/1993 | Berkey | 65/3.11 |
| 5,333,232 A * | 7/1994 | Yanagawa et al. | 385/127 |
| 5,482,525 A | 1/1996 | Kajioka et al. | 65/398 |
| 5,530,709 A | 6/1996 | Waarts et al. | 372/6 |
| 5,818,630 A | 10/1998 | Fermann et al. | 359/341 |
| 5,949,941 A | 9/1999 | DiGiovanni | 385/127 |
| 6,031,849 A | 2/2000 | Ball et al. | 372/6 |
| 6,360,565 B1 | 3/2002 | Christoff et al. | 65/403 |
| 6,373,863 B1 | 4/2002 | Ohishi et al. | 372/6 |
| 6,563,995 B2 | 5/2003 | Keaton et al. | 385/127 |

(Continued)

OTHER PUBLICATIONS

Stolen, et al.,"Short W-Tunnelling Fibre Polarisers", Electronics Letters, vol. 24, No. 9, pps. 524-525.

(Continued)

*Primary Examiner*—John D. Lee
*Assistant Examiner*—James D. Stein
(74) *Attorney, Agent, or Firm*—Suetlana Z. Short

(57) ABSTRACT

Disclosed is an optical fiber (20) having a centermost laterally-elongated core (30) having a short dimension (a), a long dimension (b) and a first refractive index ($n_1$), a moat (40) surrounding the central laterally-elongated core, the moat (40) having a second refractive index ($n_2$), an outer dimension (c) and an outer dimension (d), and a cladding (50) surrounding the moat (40), the cladding (50) having a third refractive index ($n_3$), wherein $n_1 > n_3 > n_2$, a ratio of b/a is between 1.5 and 5.0, and a ratio of d/a is between 2.0 and 7.0. The fiber supports a single (one and only one) polarization within a Single Polarization Band (SPB). The fiber (20) may be coupled to optical components in apparatus where single polarization properties are desired.

21 Claims, 8 Drawing Sheets

U.S. PATENT DOCUMENTS

2001/0026667 A1    10/2001    Kawanishi et al. .......... 385/125
2002/0172486 A1    11/2002    Fermann ...................... 385/128
2004/0258377 A1 *  12/2004    Berkey et al. ............... 385/123
2004/0258379 A1 *  12/2004    Berkey et al. ............... 385/123

OTHER PUBLICATIONS

Eickhoff, "Stress-induced single-polarization single-mode fiber", Optics Letters, vol. 7, No. 12, pp. 629-631.

Furukawa, et al., "Propagation Characteristics of a Single-Polarization Optical Fiber With an Elliptic Core and Triple-Clad", Journal of Lightwave Technology, vol. 21, No. 5, May 2003, pps. 1307-1312.

Messerly, et al., "A Broad-Band Single Polarization Optical Fiber", Journal of Lightwave Technology, vol. 9, No. 7, Jul. 1991, pps. 817-820.

Simpson, et al., "A Single-Polarization Fiber", Journal of Lightwave Technology, vol. LT-1, No. 2, Jun. 1983, pps. 370-373.

* cited by examiner

Fig. 15
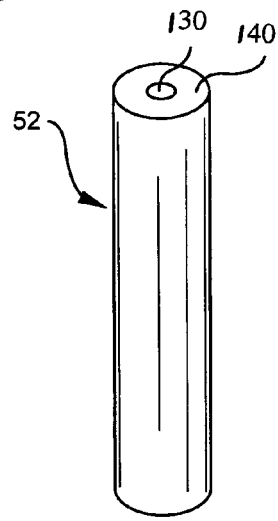
Fig. 16
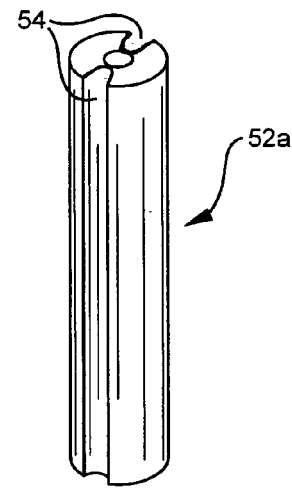
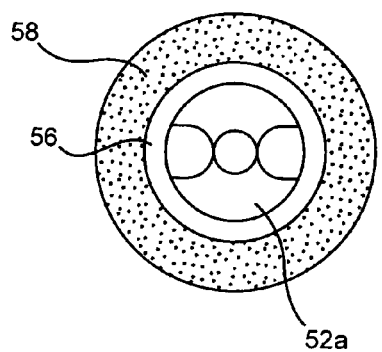
Fig. 17
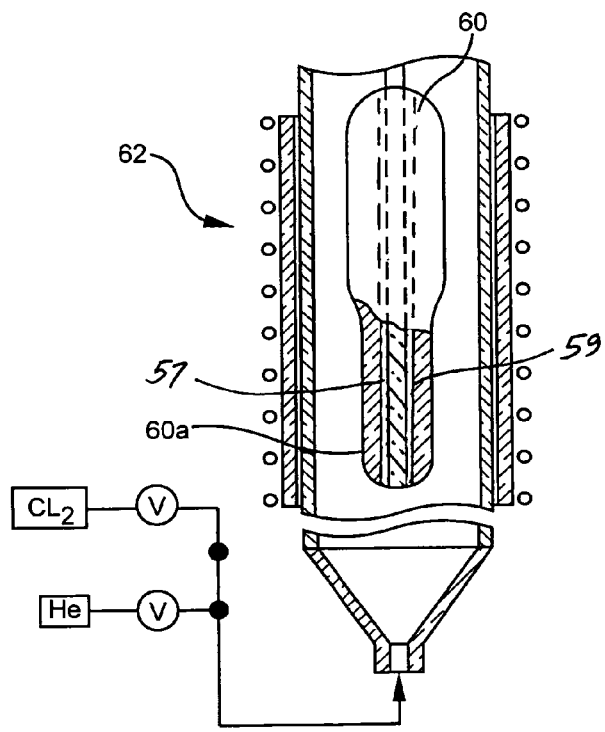
Fig. 18

SOLID TYPE SINGLE POLARIZATION FIBER AND APPARATUS

BACKGROUND OF THE INVENTION

1. Field of the Invention

The present invention relates generally to optical waveguide fibers, and more particularly to an optical fiber exhibiting single polarization properties.

2. Technical Background

Single polarization optical fibers are useful for ultra-high speed transmission systems or for use as a coupler fiber for use with, and connection to, optical components (lasers, EDFAs, optical instruments, interferometric sensors, gyroscopes, etc.). The polarization characteristic (single polarization) propagates one, and only one, of two orthogonally polarized polarizations within a single polarization band while suppressing the other polarization by dramatically increasing its transmission loss.

Polarization retaining fibers (sometimes referred to as a polarization maintaining fibers) can maintain the input polarizations on two generally-orthogonal axes. A common polarization maintaining fiber includes stress birefringence members and includes, as shown in FIG. 1, a central core 10 surrounded by an inner cladding region 11. Core 10 and cladding region 11 are formed of conventional materials employed in the formation of optical waveguides. The refractive index of the core material is greater than that of the cladding material. By way of example only, core 10 may consist of silica containing one or more dopants which increase the refractive index thereof, such as germania. Cladding region 11 may comprise pure silica, silica containing a lesser amount of dopant than core 10, or silica containing one or more down dopants, at least one of which is an oxide of an element such as boron or fluorine which lowers the refractive index of silica.

In FIG. 1, diametrically opposed relative to core 10, are two stress-inducing regions 12 formed of a glass material having a Thermal Coefficient of Expansion (TCE) different from that of cladding material 11. When such a fiber is drawn, the longitudinally-extending regions 12 and the cladding regions disposed orthogonally thereto will shrink different amounts whereby regions 12 will be put into a state of tension or compression strain. Strain induced birefringence (otherwise referred to a stress-induced birefringence) is imparted in the fiber and thereby reduces coupling between the two orthogonally polarized fundamental modes. Surrounding regions 12 is an outer cladding region 13, the refractive index of which is preferably equal to or less than that of inner cladding region 11. Region 13 may consist, for example, of any of the materials specified above for use as cladding region 11. It should be recognized that such fibers including these stress-inducing regions 12 do not provide single polarization properties.

Slight improvement in the polarization performance of single mode optical fibers has been achieved by elongating or distorting the fiber core geometry, as a means of decoupling the differently polarized waves. Examples of such optical fiber waveguides with elongated cores are disclosed in U.S. Pat. Nos. 4,184,859, 4,274,854 and 4,307,938. Prior Art FIG. 2 illustrates a waveguide 1 having a core 4 having refractive index, $n_1$, a cladding 5 having a refractive index, $n_2$, wherein the elongated core 4 has a major axis, a, and a minor axis, b. However, the noncircular geometry alone is, generally, not sufficient to provide the desired single polarization properties.

It has, therefore, been an area of ongoing development to obtain an optical fiber that will provide single polarization performance, and which is also easily manufacturable.

SUMMARY OF THE INVENTION

Definitions:

The following definitions and terminology are commonly used in the art.

Refractive index profile—the refractive index profile is the relationship between the refractive index (Δ %) and the optical fiber radius (as measured from the centerline of the optical fiber) over a selected portion of the fiber.

Radii—the radii of the segments of the fiber are generally defined in terms of points where the index of refraction of the material used takes on a different composition. For example, the central core has an inner radius of zero because the first point of the segment is on the centerline. The outer radius of the central core segment is the radius drawn from the waveguide centerline to the last point of the refractive index of the central core having a positive delta. For a segment having a first point away from the centerline, the radius of the waveguide centerline to the location of its first refractive index point is the inner radius of that segment. Likewise, the radius from the waveguide to centerline to the location of the last refractive index point of the segment is the outer radius of that segment. For example, an down-doped annular segment surrounding the central core would have an outer radii located at the interface between the annular segment and the cladding.

Relative refractive index percent Δ %—the term Δ % represents a relative measure of refractive index defined by the equation:

$$\Delta\% = 100 \times (n_i^2 - n_c^2)/2n_i^2$$

where Δ % is the maximum refractive index of the index profile segment denoted as i, and $n_c$, the reference refractive index, is taken to be the refractive index of the cladding layer. Every point in the segment has an associated relative index measured relative to the cladding.

In accordance with embodiments of the present invention, an optical fiber is provided which exhibits single polarization properties within a Single Polarization Band (SPB). The fibers parameters are preferably selected such that the SPB coincides with an operating wavelength band. The fiber preferably has a centermost laterally-elongated core including a first refractive index ($n_1$), said centermost laterally-elongated core having a short dimension (a) and a long dimension (b), a moat surrounding and abutting the central laterally-elongated core, said moat having a second refractive index ($n_2$), an outer dimension (c) along an axis X—X aligned with the long dimension (b), and an outer dimension (d) along an axis Y—Y aligned with the short dimension (a) wherein the X—X and Y—Y axes are generally orthogonal, and a cladding surrounding the moat, the cladding having a third refractive index ($n_3$), wherein $n_1 > n_3 > n_2$, a ratio of b/a is between 1.5 and 5.0, and a ratio of d/a is between 2.0 and 7.0.

This optical fiber structure produces performance preferably exhibiting a SPB width of at least 5 nm; more preferably greater than 10 nm. In particular, this fiber is preferably substantially devoid of any holes extending along its longitudinal length, i.e., it is solid in cross-section. It is believed that the fiber obtains it excellent single polarization properties because the effective refractive indices associated with each orthogonal polarization are made to be substantially different within the SPB. More particularly it is believed the effective refractive index of one of the polarizations is such that this polarization cannot propagate within the SPB, while the other orthogonal polarization associated with different effective refractive index is such that this polarization may still propagate in the SPB. Accordingly, single polarization propagation within the SPB is provided by the fiber with a relative simple structure. The present invention fiber has the advantage that it has a relatively simple structure, and is preferably devoid of holes which may reduce its strength and lower attenuation. Moreover, the present invention fiber is relatively easy to splice.

In accordance with a further aspect of the invention, a ratio of c/b is preferably less than 4.0; more preferably c/b less than 2.75; and in some embodiments less than 1.8. In accordance with a preferred embodiment, the outer dimension (d) is preferably less than the outer dimension (c). The centermost laterally-elongated core preferably contains germania-doped silica, and the moat contains fluorine- or boron-doped silica. Preferred maximum relative refractive index (Δ1) for the centermost laterally-elongated core is greater than 0.2%; more preferably between 0.5% and 2.5%. Similarly, the preferred relative refractive index (Δ2) of the moat is more negative than −0.15%; more preferably between −0.15% and −0.8%. In a preferred aspect, the ratio of b/a is between 1.5 and 5.0; and in some embodiments between 1.8 and 3.5.

In accordance with further embodiments of the present invention, an optical fiber is provided that comprises a centermost laterally-elongated core including a first refractive index ($n_1$), said laterally-elongated core having a short dimension (a) and a long dimension (b) which is longer than the short dimension (a), a moat surrounding the centermost laterally-elongated core, said moat having a second refractive index ($n_2$) and outer dimension (c) along an axis aligned with the long dimension (b), and an outer dimension (d) along an axis aligned with the short dimension (a), and a cladding surrounding the moat, the cladding having a third refractive index ($n_3$), wherein $n_1 > n_3 > n_2$, a ratio b/a is between 1.5 and 5.0, and a ratio of d/a is between 2.5 and 5.0.

In accordance with other embodiments of the present invention, an optical fiber is provided that comprises a centermost laterally-elongated core including a relative refractive index (Δ1) between 0.2% and 2.5%, said centermost laterally-elongated core having a short dimension (a) and a long dimension (b), a moat surrounding the centermost laterally-elongated core, said moat having a relative refractive index (Δ1) of less than −0.15%, an outer dimension (c) along an axis aligned with the long dimension (b), and a dimension (d) orthogonal to the dimension (c), and a cladding surrounding the moat, wherein a ratio of b/a is between 1.5 and 5.0, a ratio of d/a is between 2.0 and 7.0, and a ratio of c/b is less than 4.0.

Such fibers as described above advantageously exhibit excellent single polarization properties within a SPB. Additional features and advantages of the invention will be set forth in the detail description which follows, and in part will be readily apparent to those skilled in the art from that description or recognized by practicing the invention as described herein, including the detailed description which follows, the claims, as well as the appended drawings.

BRIEF DESCRIPTION OF THE DRAWINGS

FIGS. 15–17 and 20 are diagrams illustrating various states and subcomponents of the optical fiber perform utilized to manufacture the highly birefingent optical fiber in accordance with the present invention.

FIGS. 18–19 and 21 are diagrams illustrating various apparatus utilized in the manufacture of the highly birefingent optical fiber in accordance with the present invention.

DETAILED DESCRIPTION OF THE PREFERRED EMBODIMENTS

For purposes of the description herein, it is to be understood that the invention may assume various alternative configurations, except where expressly specified to the contrary. It is also to be understood that the specific fibers illustrated in the attached drawings, and described in the following specification are exemplary embodiments of the inventive concepts defined in the appended claims. Hence, specific dimensions and other physical characteristics relating to the embodiments disclosed herein are not to be considered as limiting unless the claims expressly state otherwise. As used herein, all optical measurements given herein are in the $LP_{01}$ mode, unless otherwise specified.

A first embodiment of the optical waveguide fiber 20 in accordance with the invention described and disclosed herein has a general cross-sectional structure, as best shown in FIGS. 3–5, 7 and 10. In the illustrated embodiment, the optical waveguide fiber 20 includes a solid cross-section, i.e., that is devoid of holes, and includes a centermost laterally-elongated core 30 that extends along the longitudinal axis, CL, of the fiber 20. This laterally-elongated core 30 has a long or maximum dimension, b, and a short or minimum dimension, a, measured orthogonally across the fiber relative to the fiber's longitudinal axis; the a and b dimensions being measured generally orthogonal to each other. The cross-sectional shape of the centermost core 30 is best described as elongated. The term "elongated" includes core shapes such as: generally oblong, oval, elliptical, diamond-shaped, or the like. Such core elongation is believed to provide at least some level of form (or geometrical) birefringence to the fiber 20. Preferably, the extent of elongation is controlled during fiber processing (e.g., redraw) such that the elongated core 30 of the drawn optical fiber 20 exhibits the desired aspect ratio, AR, defined herein as b/a. Preferably, the AR of the core 30 is greater than 1.5; more preferably between 1.5 and 5.0; more preferably in the 1.8 to 3.5 range; and in a large percentage of the embodiments, in the 1.9 to 3.0 range.

Figure 4:
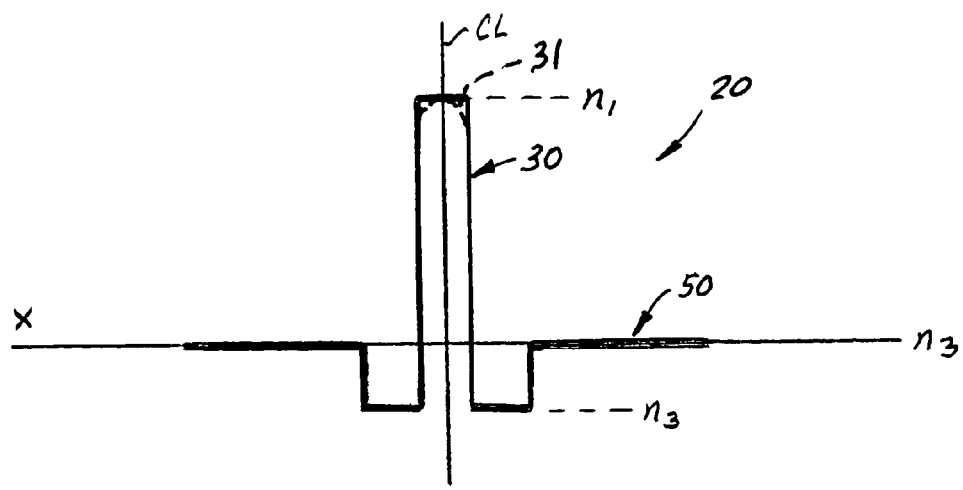
FIG. 4 is a diagram of the refractive index profile of the first embodiment taken along the axis Y—Y of FIG. 3.
Figure 5:
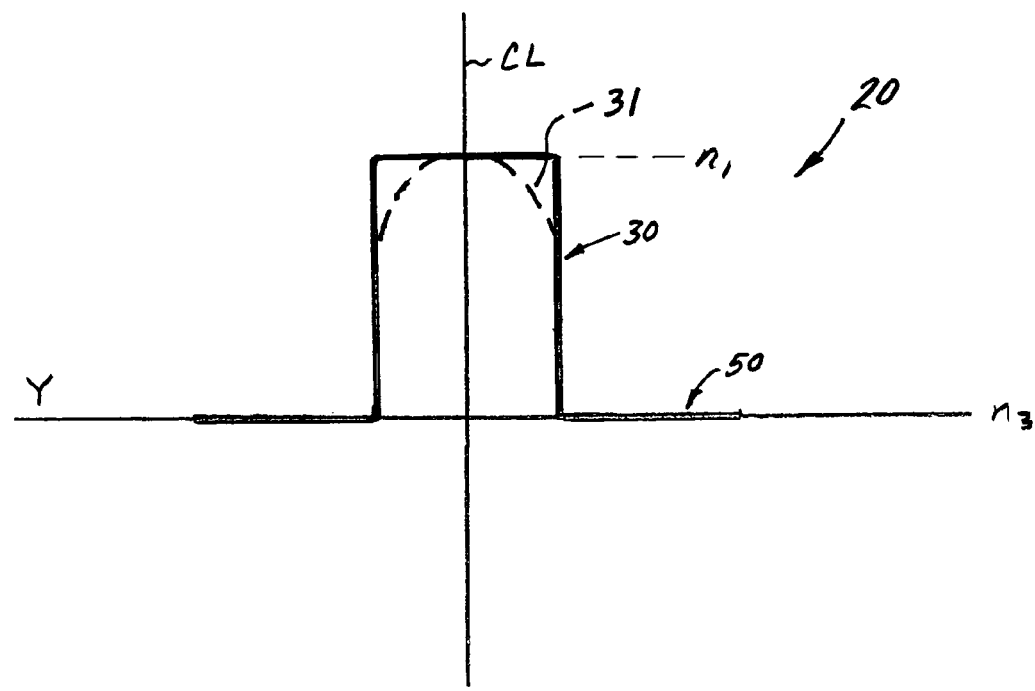
FIG. 5 is a diagram of the refractive index profile of the first embodiment taken along the axis X—X of FIG. 3.

Centermost laterally-elongated core 30 is preferably manufactured from germania-doped silica, wherein germania is provided in a sufficient amount such that the elongated core exhibits a first refractive index, $n_1$, above the refractive index, $n_3$, of the fiber's cladding 50 as best shown in FIGS. 4 and 5. Preferably, germania is added in an amount sufficient to provide the elongated core 30 with a maximum relative refractive index %, $\Delta 1$ (FIGS. 7, 10), of greater than 0.2%; more preferably greater than 1.0%; and most preferably between about 0.2% and 2.5%; and most preferably between about 0.5% and 2.5%. The lateral dimensions, a, and, b, of the centermost elongated core 30 are preferably designed to be in the range between 1.0 to 6.0 microns (more preferably 1.0 to 4.0 microns), and 3.0 to 20.0 microns (more preferably 3.0 to 12.0 microns), respectively. Furthermore, the average diameter, $D_{avg} = \{a+b\}/2$, of the centermost core 30 is preferably between about 2.0 and 13.0 microns; more preferably between 2.0 and 8.0 microns. Centermost elongated core 30 extends radially outward from the centerline, CL, of the fiber 20 and consists of up-doped silica having, preferably a step index profile shape, as shown. Optionally, the core 30 of the fiber 20 may include a graded index shape, as illustrated by dotted line 31 in FIGS. 4–5, 7 and 10.

The fiber 20 according to the present invention preferably exhibits single polarization properties, that is, it has a polarization extinction wavelength difference between the extinction wavelengths, $\lambda_1$, $\lambda_2$, of the two orthogonal fundamental polarization modes of light propagation. In particular, such fibers 20 according to the invention preferably have a Single Polarization Band (SPB) 60 of at least 5 nm in width; more preferably greater than 10 nm in width; more preferably yet greater than 20 nm in width; and most preferably greater than 25 nm in width. The SPB 60, as defined herein, is measured between the two polarization extinction wavelengths, $\lambda_1$ and $\lambda_2$, which are measured and determined at 6 dB down from the linear region 64 (See FIG. 6).

More precisely, the SPB 60 is measured down 6 dB from a departure point 63 at the top of the first knee 65 where the first polarization trace 61 departs from (splits off from) the second polarization trace 62. The SPB 60 is the wavelength band located between the extinction wavelength 61 of the trace of the first polarization and the extinction wavelength 62 of the trace of the second polarization. Within this SPB 60, true single polarization exists, that is, there is one, and only one, polarization which is provided and which propagates appreciably. For example, as can be seen from FIG. 6, only the second polarization 62 still propagates light appreciably within the SPB 60, whereas the first polarization 61 is significantly attenuated. This feature has excellent utility for use in devices systems where one and only one propagating polarization is desired.

Figure 6:
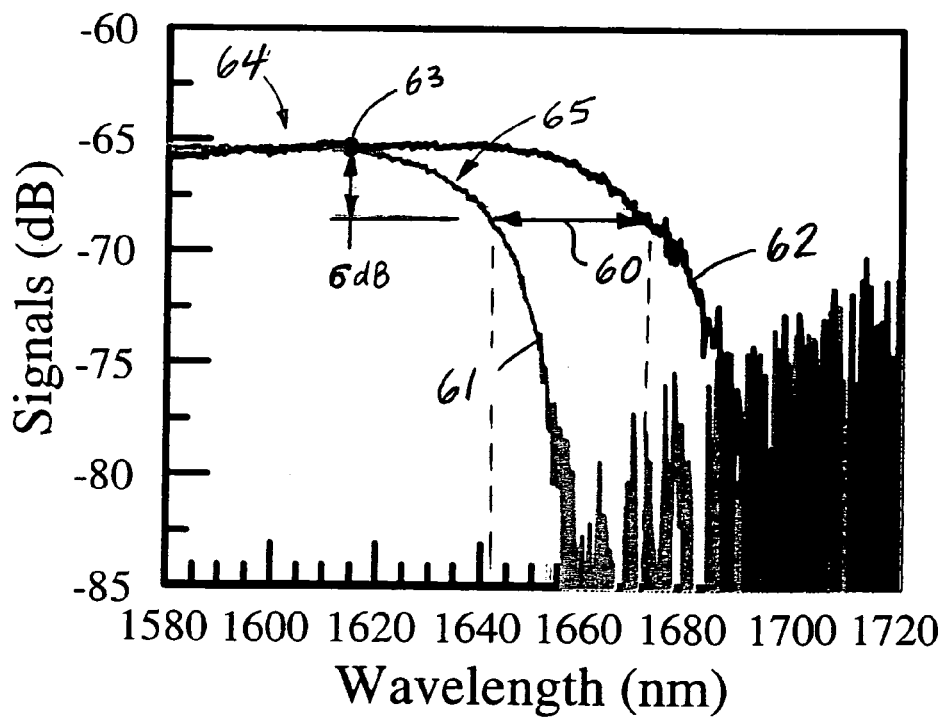
FIG. 6 is a plot illustrating the cutoff wavelength for each polarization and the single polarization band for a representative embodiment of optical fiber in accordance with the present invention.

In the exemplary embodiment shown in FIG. 6, the SPB 60 extends between the wavelengths of about 1,642 nm and 1,674 nm, thereby providing a SPB of greater than 20 nm in width, and in this instance, about 32 nm. However, it should be recognized that this range is exemplary and that other SPB widths may be designed and provided. For example, the width of the SPB 60 may be increased by increasing the core delta, $\Delta 1$. Likewise, making the b/a ratio larger (more elongated) will lead to a larger SPB width. Similarly, by adding more cladding, the SPB 60 can be shifted to shorter wavelengths. Conversely, adding less cladding may be used to lower the SPB 60 to higher wavelengths. Similarly, having a shallower moat shifts the SPB 60 to higher wavelengths. Moreover, making the Davg dimension smaller will move the SPB 60 to shorter wavelengths. Thus, it should be recognized that the SPB may be appropriately adjusted in width and/or location to fit the needs of any particular application. More particularly, the SPB 60 is preferably designed such that it coincides with the operating wavelength band, $\lambda opb$. More preferably, the center wavelength of the SPB 60 substantially coincides with the center wavelength of the operating wavelength band, $\lambda opb$. The operating wavelength band, $\lambda opb$, may be located between 800–2000 nm, 950–1250 nm, or 1450–1650 nm, for example.

Centermost elongated core 30 is preferably generally surrounded and abutted by a moat 40 having a different composition than the centermost core and preferably having an second refractive index, $n_2$, less than the first refractive index, $n_1$, i.e., $n_2<n_1$. As used herein, the term "moat" means a region having lower relative refractive index, as compared to the elongated core 30, and which generally surrounds and preferably abuts the elongated core. Most preferably, the moat 40 is down-doped relative to pure silica, and has, therefore, a negative relative refractive index (as compared to cladding). Most preferably, the moat 40 is manufactured from fluorine- or boron-doped silica, or combinations thereof. Furthermore, the moat 40 may include any combination of F, B and P as well.

Figure 1:
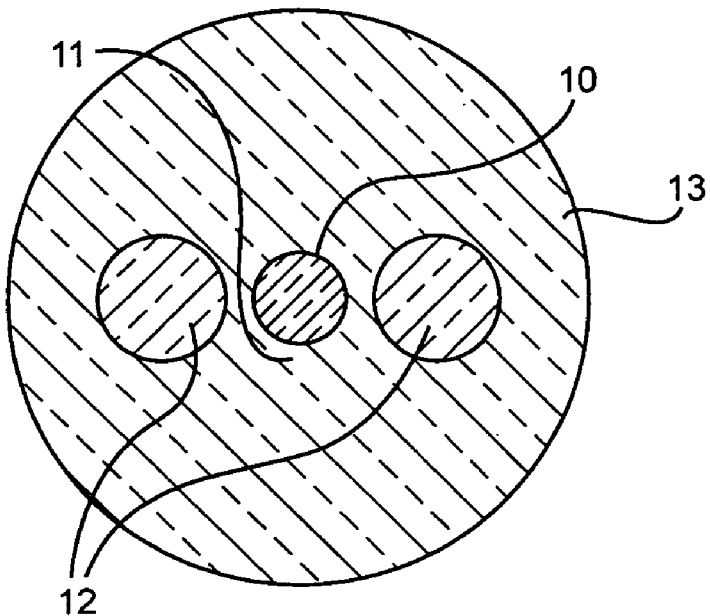
FIG. 1 is a cross-sectional view of an optical waveguide of the prior art including stress-inducing regions.
Figure 2:
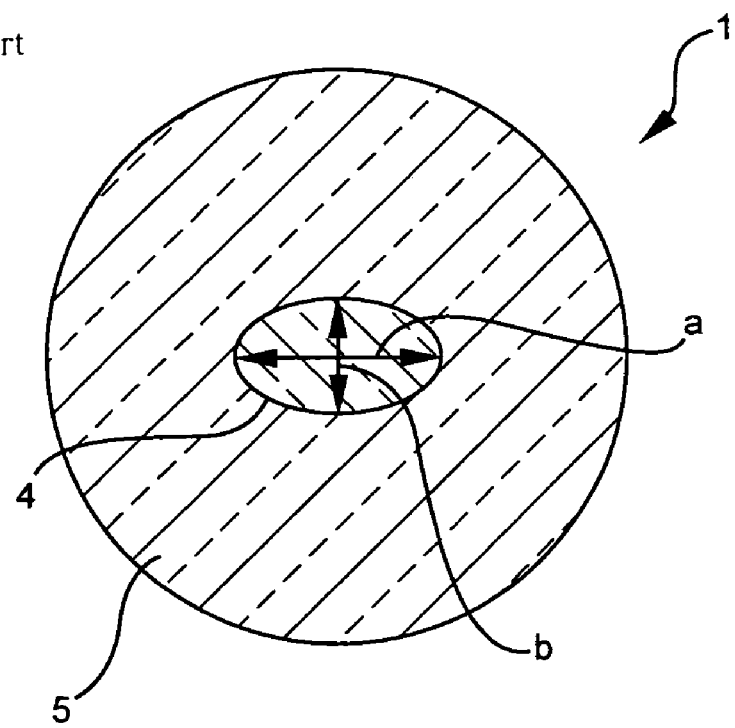
FIG. 2 is a cross-sectional view of another optical waveguide of the prior art.
Figure 3:
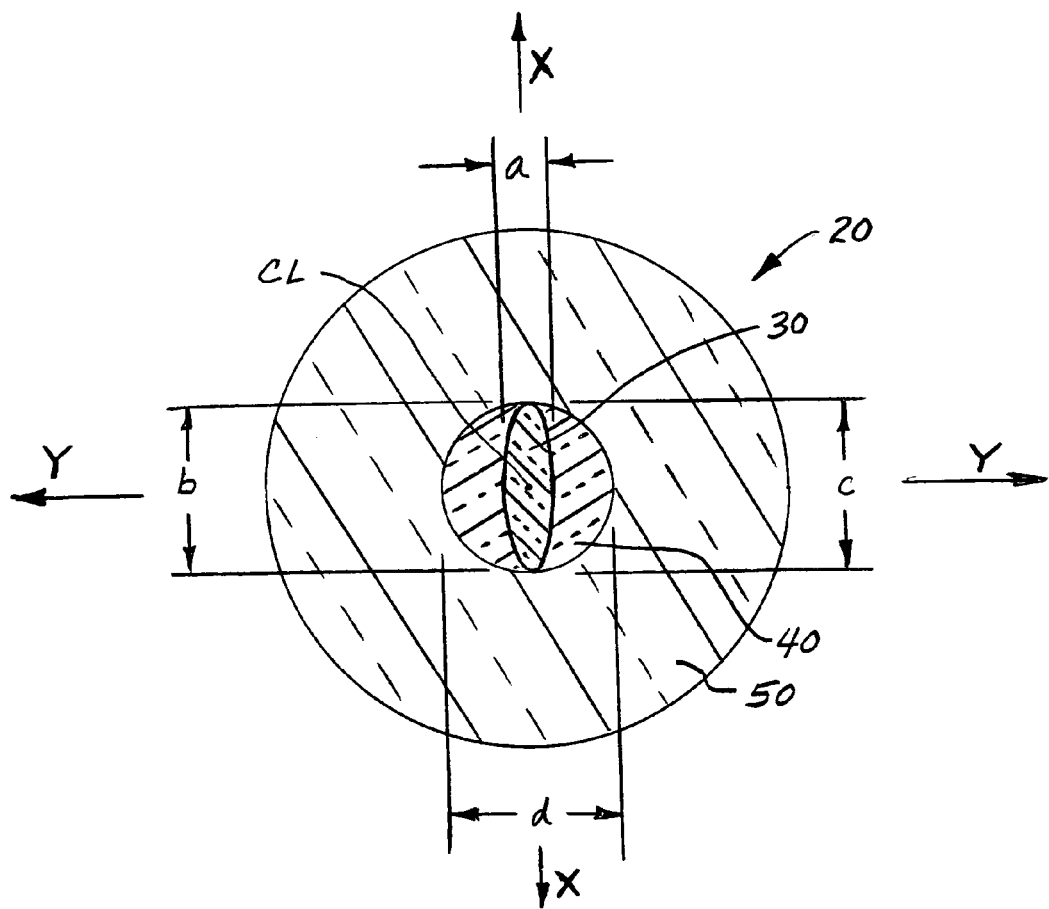
FIG. 3 is a cross-sectional view of a first embodiment of the highly birefingent optical fiber in accordance with the present invention.
Figure 7:
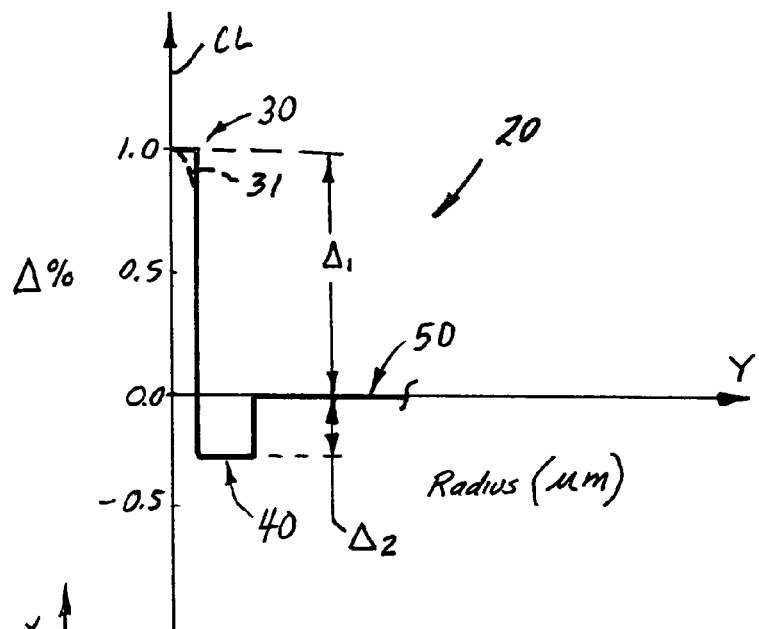
FIG. 7 is a diagram of relative refractive index versus radius of the first embodiment taken along the axis Y—Y of FIG. 3.
Figure 8:
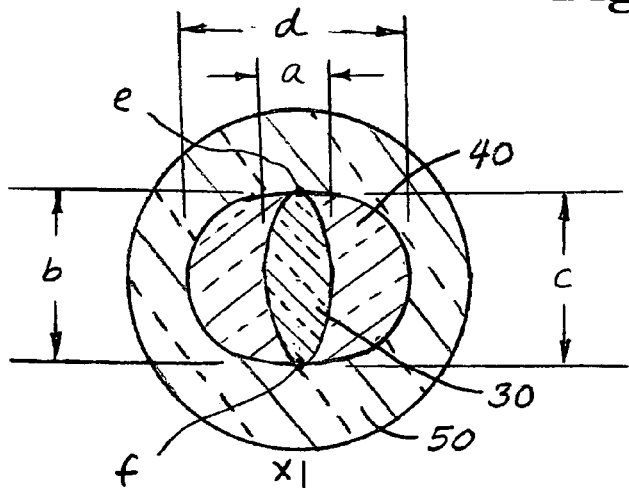
FIGS. 8–9 are cross-sectional views of additional embodiments of highly birefingent optical fibers in accordance with the present invention.
Figure 9:
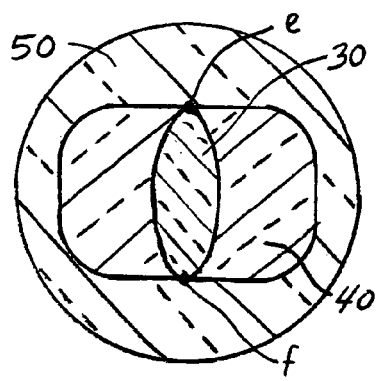

Moat 40 preferably exhibits a relative refractive index %, $\Delta 2$, as best shown in FIG. 7, which is negative (less than cladding 50); preferably more negative than about −0.15%; more preferably between about −0.15% and −0.8%; and most preferably between −0.3% and −0.6%. Generally, the glass in the moat 40 is doped such that it is appreciably less viscous at the desired draw temperature than is the centermost elongated core 30 or the cladding 50. The moat 40 is generally circular in shape as illustrated by FIG. 3 or the outer dimension, d, may be slightly smaller than the outer dimension, c (See FIG. 11). In this embodiment, the radially transverse dimensions, c, and, d, are such that the ratio of d/c is between about 0.7 and 0.95. In all embodiments, the centermost laterally-extending core 30 is preferably substantially centered within the moat 40. In some embodiments, the outside portion of the moat 40 is configured to be substantially tangent to the core 30 at the maximum or long dimension location, b, of the elongated core 30 (as shown in FIGS. 3, 8, and 9). In other words, for these tangent embodiments, the c/b ratio is approximately equal to 1.0.

The inventors herein discovered that the proper combination of sizes and shapes (ratios) of the core 30 and moat 40 provide the fiber's excellent single polarization properties. In particular, the combination of a/b and d/a ratios are believed to be important to optimize single polarization capability. In operation, because of the geometry and materials used in the core 30 and moat 40 it is believed that the effective refractive indices associated with each orthogonal polarization state are substantially different within the SPB. In particular, it should be recognized that the effective refractive index within the SPB 60 of the one polarization state is such that propagation with occur within the SPB, while the other polarization mode is very lossy because its effective refractive index so close to cladding (preferably equal to or less than cladding) that it does not effectively propagate (is cut off) within that range of wavelengths of the SPB, i.e., it is not a waveguide.

Alternatively, as best shown in FIGS. 8–9, the moat 40 may be configured to have other generally-elongated shapes, such as oval or elliptical, or rounded rectangular shape, etc. In these embodiments, the minimum dimension, c, of the moat 40, measured along axis (X—X) and aligned with the dimension, b, may be preferably substantially equal to the maximum dimension, b, of the centermost core 30 (i.e., b/c=1.0). The dimension, c, is preferably aligned along the same axis with the maximum dimension, b, of the core 30 (along X—X) such that the core and moat 40 become tangent at points e and f (See FIG. 8).

It is also important to recognize that in all embodiments described herein, the ratio of the dimension, d, (along axis (Y—Y) and aligned with the short dimension, a) of the moat 40 to the minimum dimension, a, of the elongated core 30, namely the ratio d/a, is preferably in the range of between 2.0 to 7.0; more preferably 2.5 to 5.0; and in a large number of the embodiments, 2.5 to 4.0. Again, maintaining this d/a ratio was discovered to be one important factor in providing good single polarization properties along with maintaining the desired b/a ratio described above.

Surrounding, and in contact with the moat 40 is the fiber cladding 50. The cladding 50 is preferably manufactured from pure silica and exhibits a third refractive index, $n_3$. The materials of the core 30, moat 40 and cladding 30 are selected and configured such that $n_1 > n_3 > n_2$. The cladding 50 preferably has an outer diameter of between about 80 and 140 microns; more preferably about 125 microns; but may, in some embodiments, have a cladding outer diameter greater than 150 microns, for example. The fiber 20 is then preferably covered with a conventional two-modulus coating (not shown for clarity) to an outside dimension of about 250 microns.

Figure 10:
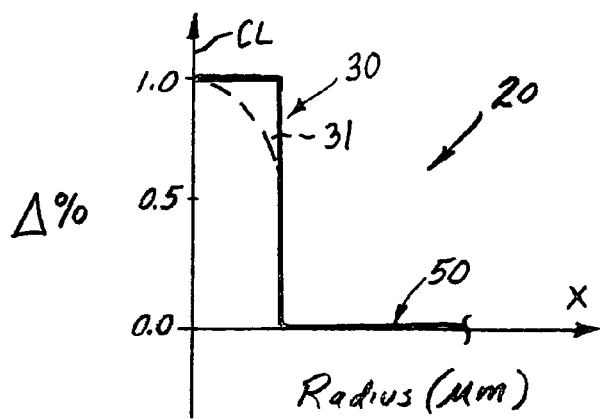
FIG. 10 is a diagram of relative refractive index versus radius of the first embodiment taken along the axis X—X of FIG. 3.

General representations of the relative refractive index profiles of the single polarization fiber 20 are illustrated in FIGS. 7 and 10 along the Y—Y and X—X axes, respectively. The plots show relative refractive index percent ($\Delta$ %) charted versus the fiber radius (in microns) and distinctly illustrate the differences in the profiles along both such axes. In particular, the plots illustrate the maximum relative refractive index of the centermost elongated core 30, $\Delta 1$, and the minimum relative refractive index of the moat 40, $\Delta 2$, both measured relative to the cladding 50. Thus, it should be readily recognized that the refractive index profiles along each axis are very different thereby attributing to the excellent single polarization properties exhibited by the fiber 20. Thus, rather than relying on extreme stress birefringence to decouple the modes as in the prior art, the present invention is directed towards changing the effective refractive index of the core in the two orthogonal polarizations such that only one polarization mode will propagate within the SPB 60. Accordingly, the single polarization properties may be obtained by utilizing relatively easy to work with constituents such as Si, Ge and F, for example.

Figure 11:
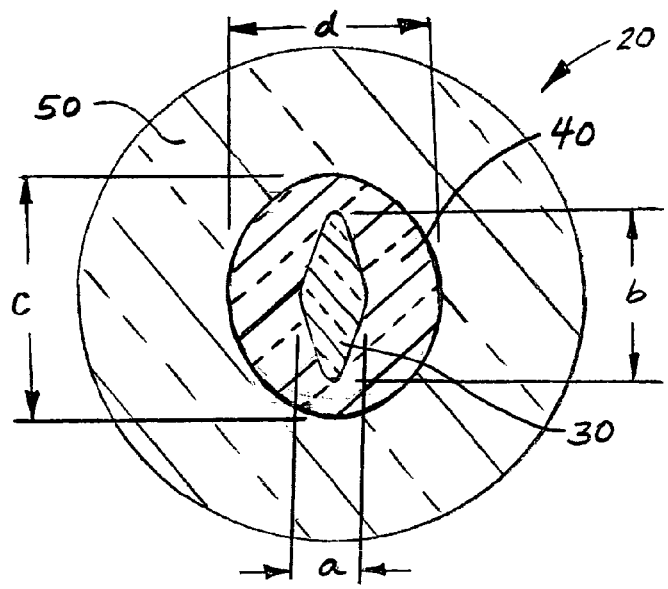
FIG. 11 is a cross-sectional view of a further embodiment of the highly birefingent optical fiber in accordance with the present invention.

Another embodiment of the fiber 20 is shown in cross-section in FIG. 11. The fiber 20 includes a diamond-shaped central core 30 made of Ge doped Si, a slightly elongated moat 40 made of F doped Si, and a cladding region 50 surrounding the moat and made of pure Si. As with the other embodiments described herein, the fiber's polymer coating is not shown for clarity. The core 30 is doped such that the core delta, $\Delta hd 1$%, is greater than 0.2% and the moat 40 is fluorine-doped sufficiently to provide a negative relative refractive index $\Delta_2$%, which is preferably less than about −0.15%. Preferably, the absolute value of $\Delta_1$% plus the absolute value of $\Delta A_2$% is greater then 0.4%.

In the FIG. 11 embodiment, the dimension, c, of the moat 40 is unequal to the dimension, b, of the core 30. Contrary to the previously-described embodiments, the dimension, c, is larger than the dimension, b, i.e., the core 30 is not tangent to the moat 40 along the long dimension, b. In particular, the c/b ratio is greater than 1.0; preferably less than about 4.0, more preferably less than 3.5; and in some embodiments, less than 2.75 or even less than 1.8. Accordingly, it should be apparent that excellent single polarization properties for the fiber are provided when the following combination of ratios are provided: c/b ratio less than 4.0, ratio of b/a in the range of 1.5 and 5.0, and d/a ratio in the range of between 2.0 and 7.0. The c/d ratio for this embodiment may be 1.0 or more.

The single polarization fibers 20 according to embodiments of the present invention each exhibit optical properties enabling single polarization (transmission of one, and only one, polarization mode) within a designed SPB 60 (See FIG. 6, for example). Preferably, the SPB 60 of the fiber 20 according to the invention is designed to be located at a wavelength between about 800 and 1700 nm. Most preferably, the fiber's SPB 60 will be designed such that a centermost wavelength thereof will substantially coincide with the centermost wavelength of the operating wavelength band of interest. For example, the SPB 60 may be designed such that the 980, 1310 or 1550 nm wavelengths fall within it, such that it is readily useable with optical components and systems operating at the 980, 1310 or 1550 nm windows/bands. In particular, it is preferred that the fiber parameters be selected such that the center wavelength of the SPB 60 substantially coincides (within about +/−20 nm) with the center wavelength of the operating wavelength of interest.

The preferred structure described herein for the fibers 20 in accordance with the invention produces optical measurements as described below. In particular, the single polarization fiber 20 preferably exhibits a SPB 60 of at least 5 nm in band width, more preferably greater than 10 nm in width; more preferably yet greater than 15 nm; and most preferably greater than 20 nm (all measured on a 1 m length). Furthermore, the fiber 20 preferably exhibits attenuation at the center wavelength of the SPB 60 of less than 25 dB/km; more preferably less than 5 dB/km. Each of the fibers described below include physical structures similar to that shown in FIGS. 3 and 11, but instead of having step index shapes on the core, include gradient index shapes as illustrated by dotted line 31, with alpha being about 2.

The measured structural and optical properties of several experimental fibers (Ex. 1–4) are given in Table 1 below.

TABLE 1

Optical Properties and Structure For Experimental Fibers

| Example # | Ex. 1 | Ex. 2 | Ex. 3 | Ex. 4 |
|---|---|---|---|---|
| Dimension (a) (μm) | 3.56 | 2.60 | 3.96 | 3.4 |
| Dimension (b) (μm) | 9.65 | 5.73 | 11.8 | 5.4 |
| Dimension (c) (μm) | 16.9 | 7.06 | 11.8 | 9.5 |
| Dimension (d) (μm) | 12.0 | 6.6 | 13.1 | 8.8 |
| $D_{avg}$ (μm) | 6.61 | 4.17 | 7.88 | 4.4 |
| b/a ratio | 2.71 | 2.20 | 2.98 | 1.59 |
| c/b ratio | 1.75 | 1.23 | 1.00 | 1.76 |
| d/a ratio | 3.37 | 2.54 | 3.3 | 2.59 |
| Δ1 (%) | 1.0 | 2.0 | 0.25 | 2.0 |
| Δ2 (%) | −0.4 | −0.5 | −0.2 | −0.4 |
| Beat Length, $L_B$ (mm) | na | 1.7 | >10 | 1.9 |
| @ wavelength | | @ 1550 nm | @ 1550 nm | @ 980 nm |
| Attenuation (dB/m) | na | 0.0036 | 0.030 | 3.170 |
| | | @ 1550 nm | | |
| P1 Extinction λ1 (nm) | 1430 | 1649 | 1014 | 1457 |
| P2 Extinction λ2 (nm) | 1452 | 1683 | 1024 | 1476 |
| SP Band Bandwidth (nm) | 22 | 34 | 10 | 19 |

Beat length, $L_B$, for each example fiber 20 was also measured. In particular, beat length, $L_B$, was measured using a direct Differential Group Delay (DGD) technique. Since the fibers can transmit light for both polarizations up to the first polarization extinction wavelength, $\lambda_1$, a Model PAT-9000B available from Tektronics may be used to measure Differential Group Delay (DGD) of the fiber below the first extinction wavelength, $\lambda_1$. From that measurement, the beatlength may be calculated (extrapolated) for any wavelength below $\lambda_1$. The beatlength may be calculated from the measured DGD by the following equation, $$L_B = \frac{\lambda L}{c \cdot DGD}$$

where
$\lambda$ is the wavelength of interest,
L is the length of the optical fiber under test, and
c is the speed of light in vacuum.

Figure 22:
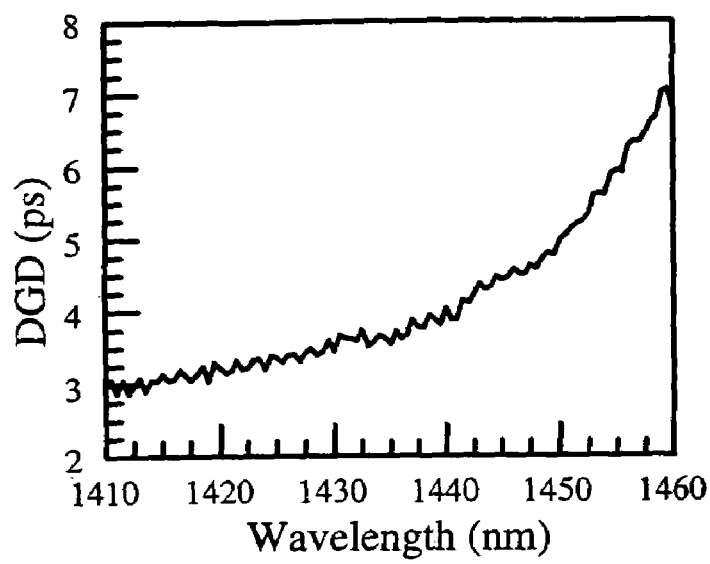
FIG. 22 is a diagram illustrating DGD as a function of wavelength for an embodiment of the fiber in accordance with the present invention.

FIG. 22 shows the DGD as a function of wavelength for an example fiber (Ex. 4). It is evident that the DGD is wavelength dependent. By selecting the data at 1420 nm, for example, we get DGD value of 3.146 ps. Thus, the calculated beatlength, $L_B$, of the fiber at this wavelength (1420 nm) is 2.8 mm. The beatlength at any lower wavelength (below $\lambda_1$) may be determined by using the equation:

$$L_B = \lambda/\Delta n.$$

As an additional example, the beat length, $L_B$, of the present fiber 20 of Ex. 2 was measured to be less than 2.0 mm (about 1.7 mm) at 1550 nm. Using the above equation, the beatlength, $L_B$, at 980 nm is estimated to be about 1.9 mm for Ex. 2. This indicates that the example fiber is highly birefringent. Thus, it should be recognized that each of the fibers described herein, which have low beatlength, $L_B$ (less than 10 mm), at a wavelength below the SPB 60 (i.e., below $\lambda_1$) will offer good polarization maintaining properties. Ex. 2 above offers excellent polarization maintaining properties with a beatlength of less than 2.0 mm at a wavelength below the single polarization band (e.g., at 1550 nm).

Additionally, the extinction wavelength of the first polarization, $\lambda_1$, extinction wavelength of the second polarization, $\lambda_2$, and Single Polarization Bandwidth (difference between the extinction wavelengths of the two polarizations) have been determined for each modeled fiber 20. For each measurement a non-polarized white light source is used which has a flat spectrum from 300–2000 nm. A polarizer is then inserted at the light launching end and set to the two polarization axes determined from the measurement of the extinction ratio to perform the extinction wavelength testing for each polarization.

The attenuation of the single polarization fiber 20 is measured by a standard Time Domain Reflectometer method (labeled "ODTR") or by a cutback method (labeled "CB"). In particular, the Time Domain Reflectometer (ODTR) method was performed on an HP 8147 ODTR at 1550 nm. The cutback method was performed by measuring the power p1 on a first length (approx. 2 m) of fiber using a white light source, and then cutting the fiber into a shorter length (approx. 1 m) and measuring the power p2. The attenuation is then calculated as:

$$Attn = [10 \log p1 - 10 \log p2]/L$$

where L is the length removed. Where the wavelength is not specified, it may be assumed that the cutoff method was employed. The best measurement for the experimental fiber examples achieved an attenuation of less than 0.004 dB/m at 1550 nm using OTDR measurement. In particular, several of the experimental examples exhibit attenuation of less than 0.04 dB/m using the cutback method.

Figure 23:
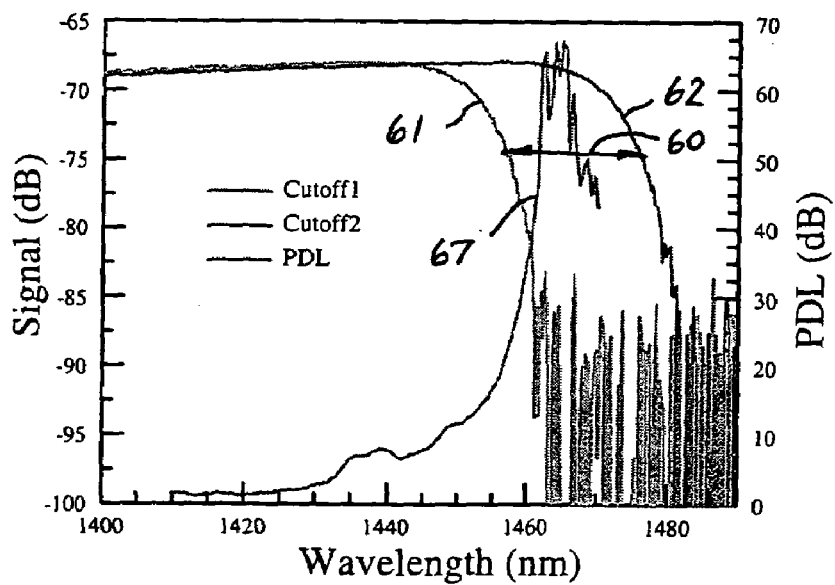
FIG. 23 is a diagram illustrating Polarization Dependent Loss (PDL) as a function of wavelength and the position of maximum PDL within the single polarization band for an embodiment of the fiber in accordance with the present invention.

Another important property of the single polarization fibers 20 in accordance with the present invention is the Extinction Ratio (ER) for single polarization operation, which is defined by the relative strength of the power transmitted through the fiber between the two polarization modes in dB within the SPB 60. As shown in FIG. 23, for single polarization fibers having two linear polarization modes, 61, 62, as in the present invention, the standard measurement of Polarization Dependent Loss (PDL) 67 is substantially equivalent to the extinction ratio measurement within the SPB 60. Further information concerning PDL measurements may be found in Dennis Derickson, (Editor), "Fiber Optic Test and Measurement", Chapter 9, Prentice-Hall Inc. (1998). For the present invention fibers 20 described herein, the PDL and ER are measured, and ER exhibits values greater than 30 dB within the SPB 60; more preferably greater than 40 dB within the SPB 60; and in some embodiments, greater than 50 dB within the SPB 60. FIG. 22 illustrates the Differential Group Delay (DGD) for a representative fiber from which the beat length is determined as explained previously.

Table 2 shown below illustrates several modeled examples (Case #'s I–IX) of the single polarization fiber 20 in accordance with the present invention. The general refractive index structure of these modeled examples I–IX is as shown in FIGS. 3–5.

TABLE 2

Modeled Examples

| | Case # | | | | | | | | |
|---|---|---|---|---|---|---|---|---|---|
| | I | II | III | IV | V | VI | VII | VIII | IX |
| Δ1 (%) | 1.0 | 1.5 | 1.5 | 1.5 | 1.5 | 1.5 | 1.5 | 2.0 | 1.5 |
| Δ2 (%) | −0.4 | −0.5 | −0.5 | −0.5 | −0.4 | −0.5 | −0.5 | −0.5 | −0.7 |
| Dim. (a) (μm) | 2.5 | 1.9 | 1.2 | 1.9 | 1.9 | 1.9 | 1.9 | 1.6 | 1.9 |
| Dim. (b) (μm) | 4.9 | 3.8 | 3.8 | 3.8 | 3.8 | 3.8 | 3.8 | 3.2 | 3.2 |
| Dim. (c) (μm) | 10.4 | 7.4 | 3.8 | 7.2 | 7.4 | 12.8 | 5.8 | 8.0 | 7.2 |
| Dim. (d) (μm) | 10.4 | 7.4 | 3.8 | 7.2 | 7.4 | 6.4 | 12.0 | 8.0 | 7.2 |
| Davg (μm) | 3.70 | 2.85 | 2.50 | 2.85 | 2.85 | 2.85 | 2.85 | 2.40 | 2.55 |
| b/a ratio | 1.96 | 2.00 | 3.17 | 2.00 | 2.00 | 2.00 | 2.00 | 2.00 | 1.68 |
| c/b ratio | 2.67 | 1.95 | 1.00 | 1.89 | 1.95 | 3.37 | 1.53 | 2.50 | 1.00 |
| d/a ratio | 4.16 | 3.89 | 3.17 | 3.79 | 3.89 | 3.37 | 6.32 | 5.00 | 3.78 |
| Beat Length (mm)/@ | 7.3/ | 5.3/ | 5.4/ | 5.4/ | 6.0/ | 6.0/ | 5.1/ | 3.7/ | 2.3/ |
| wavelength (nm) | 1520 | 1520 | 1520 | 1520 | 1550 | 1550 | 1520 | 1520 | 1380 |
| $\lambda_1$ Extinct (nm) | 1538 | 1546 | 1544 | 1570 | 1675 | 1527 | 1539 | 1555 | 1421 |
| $\lambda_2$ Extinct (nm) | 1572 | 1570 | 1592 | 1615 | 1716 | 1567 | 1581 | 1597 | 1467 |
| SPB Width (nm) | 34 | 44 | 46 | 45 | 41 | 40 | 42 | 44 | 46 |

As can be seen from the modeled examples in Table 2, the relative refractive index parameters Δ1%, Δ2% and the core and moat dimensions a, b, c, and d (adjusting the Davg, a/b ratio, c/b ratio and d/a ratio) may be adjusted to cause a resultant change in the beat length, extinction wavelengths, $\lambda_1$ Extinct, $\lambda_2$ Extinct, of the two polarizations, as well as the width of the SPB. Accordingly, it should be recognized that the SPB for the fiber 20 may be readily adjusted thereby allowing use in a multitude of systems and devices which operate at different operating bands. In particular, the fiber's parameters may be selected and designed such that the SPB may be designed to substantially coincide with the operating wavelength band of interest for the system or device.

Figure 12:
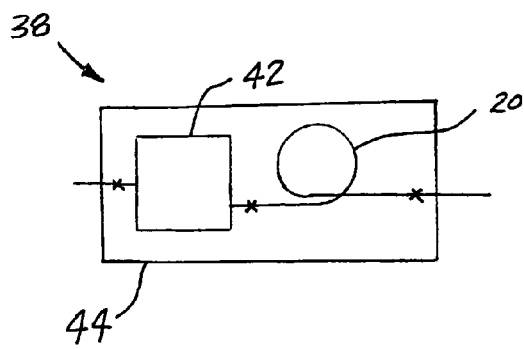
FIGS. 12–14 are block diagrams of various systems or apparatus including the highly birefingent optical fiber in accordance with the present invention.

FIG. 12 illustrates one apparatus 38 employing the single polarization fiber 20 according to the embodiments described herein. The system apparatus 38 includes an optical device 42, such as a laser, gyroscope, sensor, modulator, beam splitter, polarization multiplexer, or the like having the fiber 20 in accordance with the invention included therein or otherwise attached or optically coupled thereto. The fiber 20 and the optical component 42 may be included in a housing 44 and comprise subcomponents in the apparatus 38.

Figure 13:
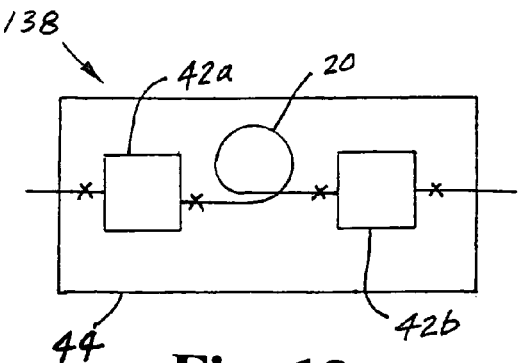

Shown in FIG. 13 is another apparatus 138 wherein the fiber 20 in accordance with embodiments of the invention is attached between optical components 42a, 42b and wherein the fiber 20 and the optical components are optionally contained within a housing 44.

Figure 14:
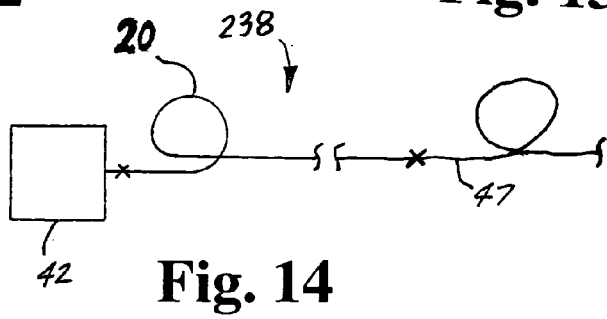

Similarly, FIG. 14 illustrates a system apparatus 238 wherein the fiber 20 in accordance with embodiments of the invention is attached to an optical component 42 and wherein the fiber is also optically coupled to another type of fiber 47. The x's shown in FIGS. 12–14 designate splices, connectors, or other like optical connections.

Fibers 20 described herein are preferably formed utilizing the following method of manufacturing. First, a rod-shaped core cane 52, as shown in FIG. 15, is provided. The cane 52 includes portions 130, 140 which correspond to the centermost core 30 and the moat 40 and which have the proper germania and fluorine doping and a core/moat ratio of about 0.45. The core cane 52 was preferably 1 meter long and about 13–15 mm in diameter and was manufactured by a conventional OVD method. Grooves 54 are then ground into the diametrically opposite longitudinal sides of the cane 52 to a width of about 3.4 mm and to a depth of about 4.0 mm, as illustrated in FIG. 16, thereby forming grooved cane 52a. The grooved rod 52a was then HF etched for about 30 minutes to simply clean any grinding residue. The grooved cane 52a is then inserted into a 1 meter long silica tube 56 overclad with silica soot 58, as shown in FIG. 17, to form a perform subassembly 60. Silica overcladding 58 is preferably produced by an Outside Vapor Deposition (OVD) method on the sleeve 56, for example.

Figure 19:
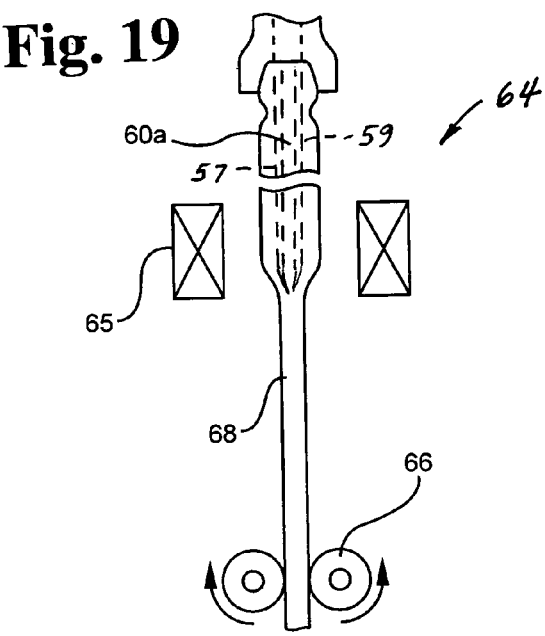

The perform subassembly 60 of FIG. 17 is then consolidated in accordance with a conventional consolidation process as shown in FIG. 18 by first drying in a consolidation furnace 62 in an atmosphere of $Cl_2$, and then consolidating in the furnace in a He-containing atmosphere to vitrify the glass and produce a fully consolidated perform 60a. The holes 57, 59 in the consolidated perform are then etched in HF to remove additional material. Alternatively, $NF_3$ could be used as an etchant. The consolidated perform 60a is then inserted into a redraw tower 64, as shown in FIG. 19. Heat is applied to consolidated perform 60a by heating element 65 and it is drawn down by tension applying wheels 66 into an approximately 8 mm diameter core cane 68. While the redraw process (drawing to a smaller diameter core cane from the perform 60a) is occurring, a vacuum is applied to the holes 57, 59 sufficient to completely close them during redraw. During hole closure and the redraw step, the portion corresponding to the central core elongates laterally and produces the general elongated core configuration as described herein.

Figure 20:
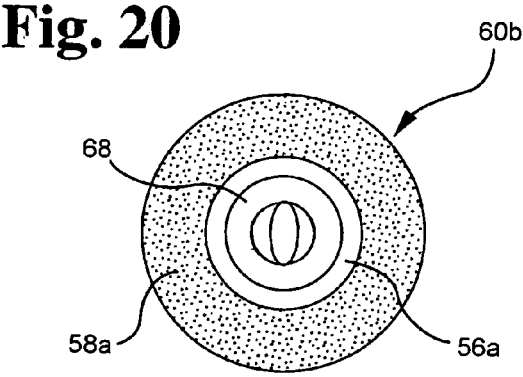
Figure 21:
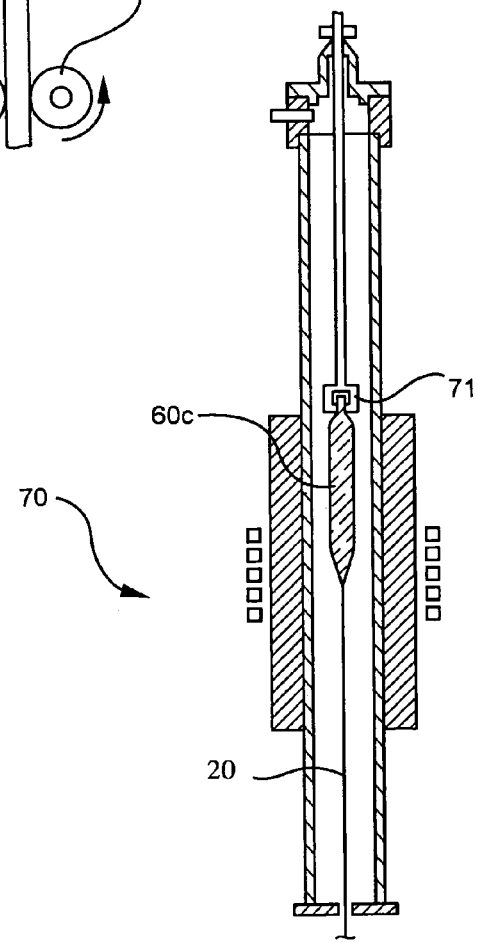

This cane 68, now having an elongated central core, is again inserted into a 1 meter long silica tube 56a overclad with silica soot 58a, as shown in FIG. 20, to form a perform subassembly 60b having the desired core/clad ratio. This perform subassembly 60b is again consolidated in the same manner as heretofore described with respect to FIG. 18. The fully consolidated blank 60c produced therefrom is then suspended from a handle 71 within a draw furnace 70, as shown in FIG. 21, and the fiber 20 in accordance with aspects of the invention is drawn using conventional draw methods.

It will be apparent to those skilled in the art that variations and modifications can be made to the present invention without departing from the scope of the invention. For example, although step index structures are show, other graded index structures may be employed. Moreover a ring structure may be added to the fiber profile as well and would still function acceptably. Thus, it is intended that the present invention cover the modifications and variations of this invention provided they come within the scope of the appended claims and their equivalents.

What is claimed is:

1. An optical fiber, comprising:
   a centermost laterally-elongated core including a first refractive index ($n_1$), said centermost laterally-elongated core having a short dimension (a) and a long dimension (b),
   a moat surrounding having a second refractive index ($n_2$) and abutting the central laterally-elongated core, an outer dimension (c) along an axis X—X aligned with the long dimension (b), and an outer dimension (d) along an axis Y—Y aligned with the short dimension (a) wherein the axis X—X is generally orthogonal with the axis Y—Y, and
   a cladding surrounding the moat, the cladding having a third refractive index ($n_3$), wherein
   $n_1 > n_3 > n_2$,
   a ratio of b/a is between 1.5 and 5.0,
   a ratio of d/a is between 2.0 and 7.0, and
   the optical fiber exhibits single polarization propagation within a single polarization band.

2. The optical fiber of claim 1 further comprising a ratio of c/b less than 4.0.

3. The optical fiber of claim 2 further comprising a ratio of c/b less than 2.75.

4. The optical fiber of claim 1 further comprising
   a ratio of c/b less than 2.75, and
   a ratio of d/a less than 6.5.

5. The optical fiber of claim 1 wherein the outer dimension (d) is less than or equal to the outer dimension (c).

6. The optical fiber of claim 1 wherein the centermost laterally-elongated core contains germania-doped silica and the moat contains fluorine-doped silica.

7. The optical fiber of claim 1 further comprising a maximum relative refractive index ($\Delta 1$) of the centermost laterally-elongated core of greater than 0.2%.

8. The optical fiber of claim 1 further comprising a maximum relative refractive index ($\Delta 1$) of the centermost laterally-elongated core of between 0.5% and 2.5%.

9. The optical fiber of claim 1 further comprising a relative refractive index ($\Delta 2$) of the moat of more negative than −0.15%.

10. The optical fiber of claim 1 further comprising a relative refractive index ($\Delta 2$) of the moat between −0.15% and −0.8%.

11. The optical fiber of claim 1 further comprising a short dimension (a) between 2 to 5 microns and a long dimension (b) between 5 and 20 microns.

12. The optical fiber of claim 1 wherein a ratio of c/b is less than 1.8.

13. The optical fiber of claim 1 wherein the ratio of b/a is between 1.8 and 3.5.

14. The optical fiber of claim 1 wherein the single polarization band has a bandwidth of at least 5 nm.

15. The optical fiber of claim 14 wherein the bandwidth is at least 10 nm.

16. The optical fiber of claim 14 wherein the bandwidth is at least 25 nm.

17. The optical fiber of claim 14 having a beat length below the single polarization band of less than 2.0 mm.

18. An apparatus including the optical fiber of claim 1.

19. The optical fiber of claim 1 wherein the moat contains fluorine- or boron-doped silica.

20. An optical fiber, comprising:
    a centermost laterally-elongated core including a first refractive index ($n_1$), said laterally-elongated core having a short dimension (a) and a long dimension (b) which is longer than the short dimension (a),
    a moat surrounding the centermost laterally-elongated core, said moat having a second refractive index ($n_2$) and outer dimension (c) along an axis aligned with the long dimension (b), and an outer dimension (d) along an axis aligned with the short dimension (a), and
    a cladding surrounding the moat, the cladding having a third refractive index ($n_3$), wherein
    $n_1 > n_3 > n_2$
    a ratio b/a is between 1.5 and 5.0,
    a ratio of d/a is between 2.5 and 5.0, and
    the optical fiber exhibits single polarization propagation within a single polarization band.

21. An optical fiber, comprising:
    a centermost laterally-elongated core including a relative refractive index ($\Delta 1$) between 0.2% and 2.5%, said centermost laterally-elongated core having a short dimension (a) and a long dimension (b),
    a moat surrounding the centermost laterally-elongated core, said moat having a relative refractive index ($\Delta 1$) of less than −0.15%, an outer dimension (c) along an axis aligned with the long dimension (b), and a dimension (d) orthogonal to the dimension (c), and
    a cladding surrounding the moat,
    wherein
    a ratio of b/a is between 1.5 and 5.0,
    a ratio of d/a is between 2.0 and 7.0,
    a ratio of c/b is less than 4.0, and
    the optical fiber exhibits single polarization propagation within a single polarization band.

* * * * *